United States Patent [19]

Brubaker

[11] 4,080,922

[45] Mar. 28, 1978

[54] FLYABLE HYDROFOIL VESSEL

[76] Inventor: Curtis M. Brubaker, 11400 Chenault St., Los Angeles, Calif. 90049

[21] Appl. No.: 730,013

[22] Filed: Oct. 6, 1976

Related U.S. Application Data

[63] Continuation-in-part of Ser. No. 611,158, Sep. 8, 1975, abandoned.

[51] Int. Cl.² ............................................. B63B 1/30
[52] U.S. Cl. ................................... 114/282; 244/108
[58] Field of Search ............................. 114/271–276, 114/278, 280, 282, 122, 123; 244/81, 82, 90 R

[56] References Cited

U.S. PATENT DOCUMENTS

| | | | |
|---|---|---|---|
| 1,779,168 | 10/1930 | Isom | 244/81 |
| 1,976,046 | 10/1934 | Tietjens | 114/280 |
| 2,173,273 | 9/1939 | Seversky | 244/81 |
| 2,603,179 | 7/1952 | Gardiner | 114/280 |
| 2,713,317 | 7/1955 | Herz | 114/282 |
| 2,734,704 | 2/1956 | Vogt | 244/82 |
| 2,842,083 | 7/1958 | Vertens | 114/274 |
| 3,139,059 | 6/1964 | Hanford, Jr. | 114/282 |
| 3,357,389 | 12/1967 | Wray, Jr. | 114/282 |
| 3,800,724 | 4/1974 | Tracy | 114/280 |
| 3,804,047 | 4/1974 | Faber et al. | 114/282 |

*Primary Examiner*—Trygve M. Blix
*Assistant Examiner*—Jesus D. Sotelo
*Attorney, Agent, or Firm*—William W. Haefliger

[57] ABSTRACT

A high-performance hydrofoil craft is capable of achieving hullborne, foilborne and airborne configurations. Transition between modes may be driver controlled or automatic, as a function of forward speed. Emergency landings and quick stops are enabled.

26 Claims, 26 Drawing Figures

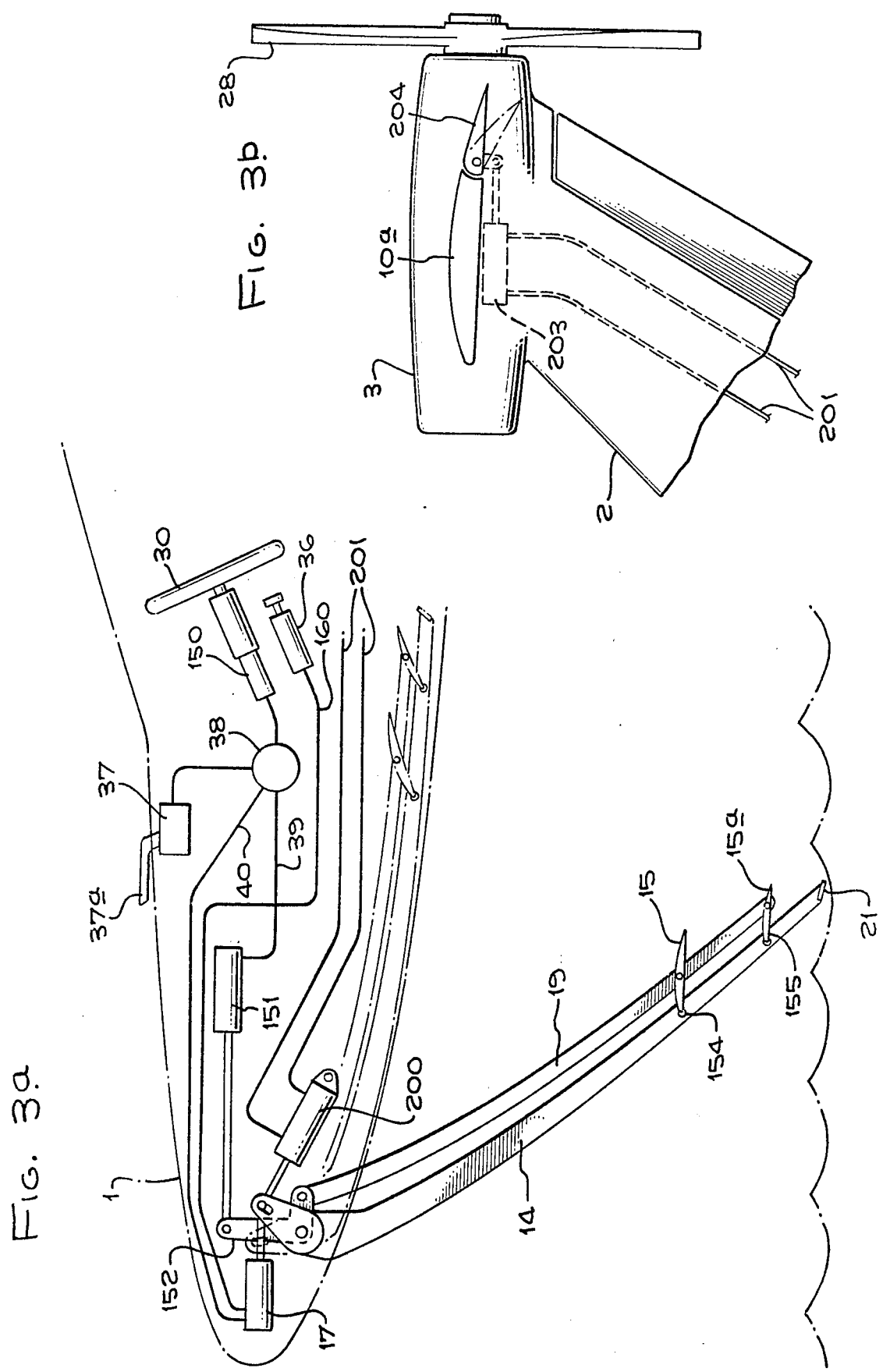

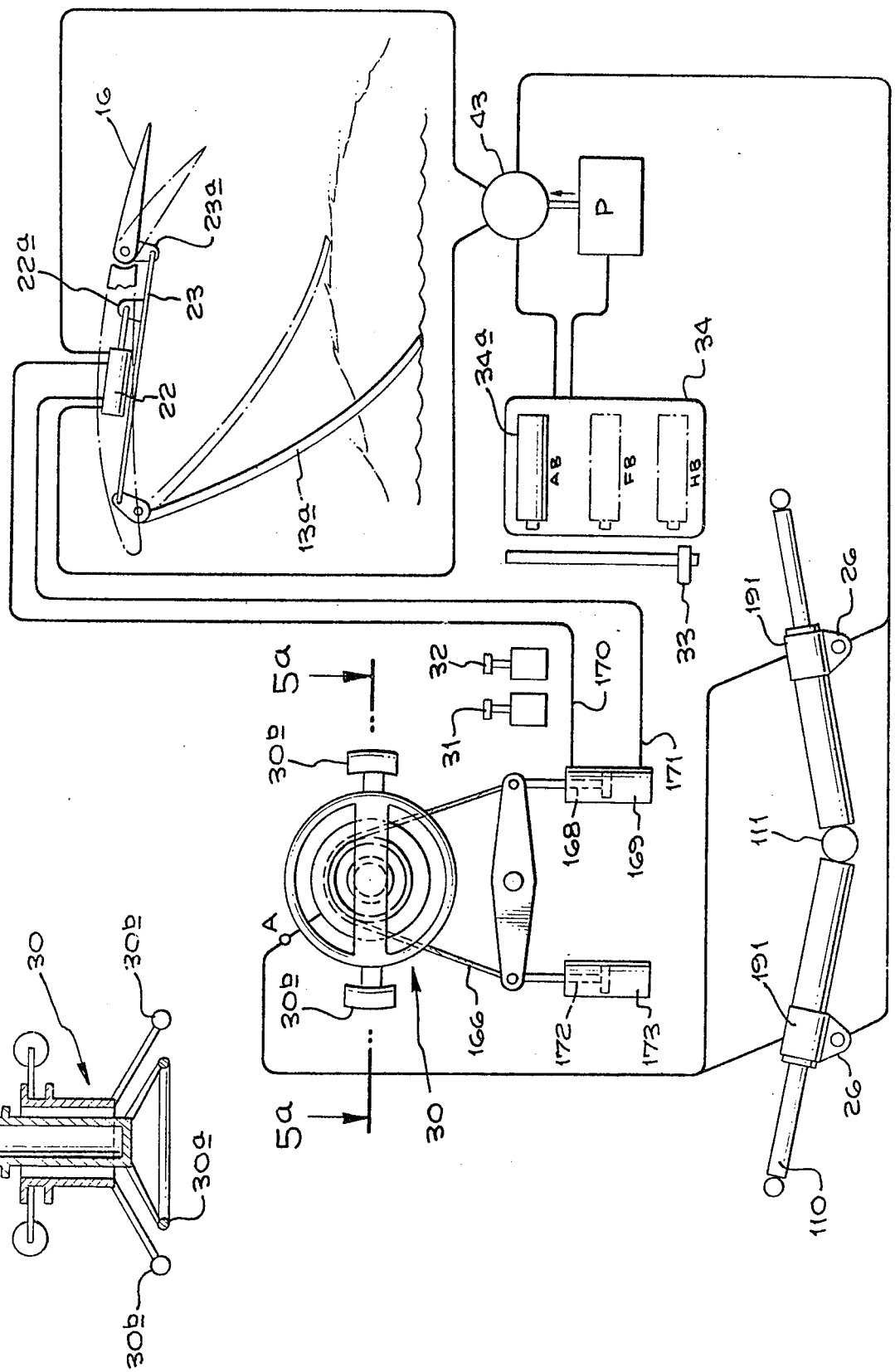

FIG. 10.a
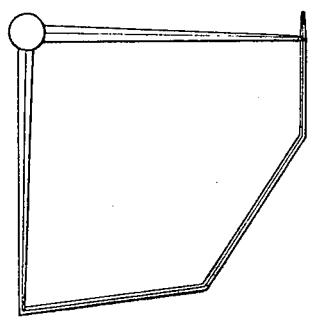
FIG. 10.b
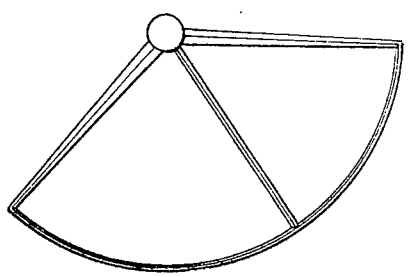
FIG. 10.c
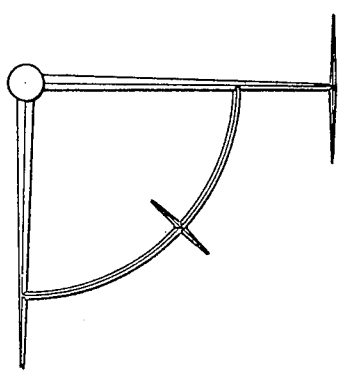
FIG. 10.d
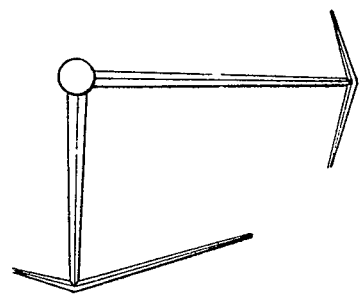
FIG. 10.e
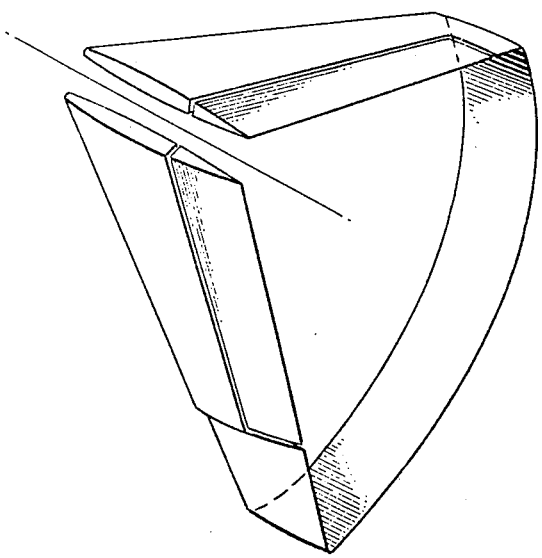
FIG. 10.f
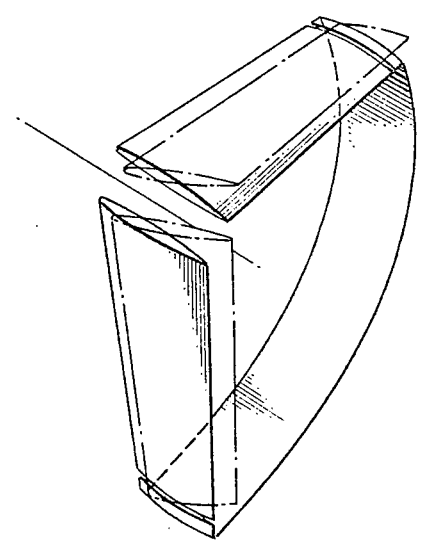

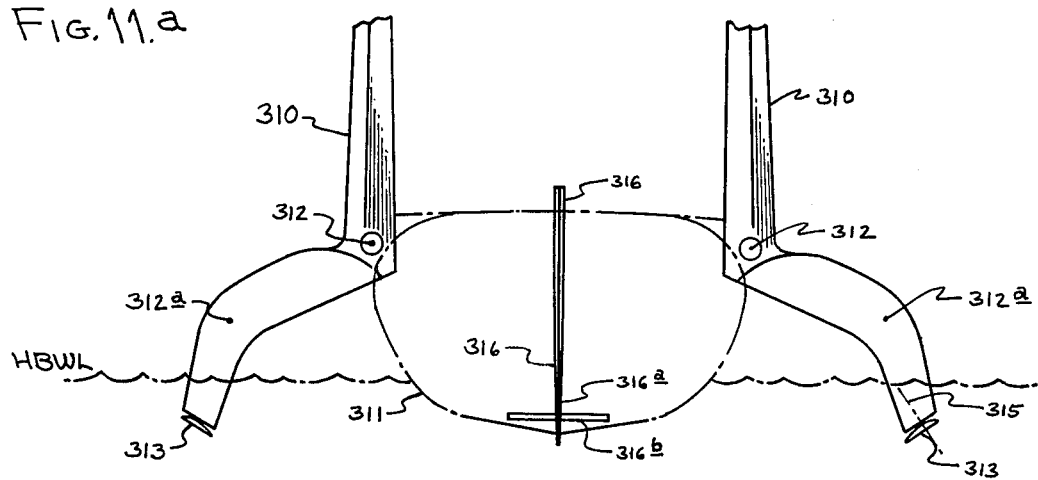
FIG.11.a
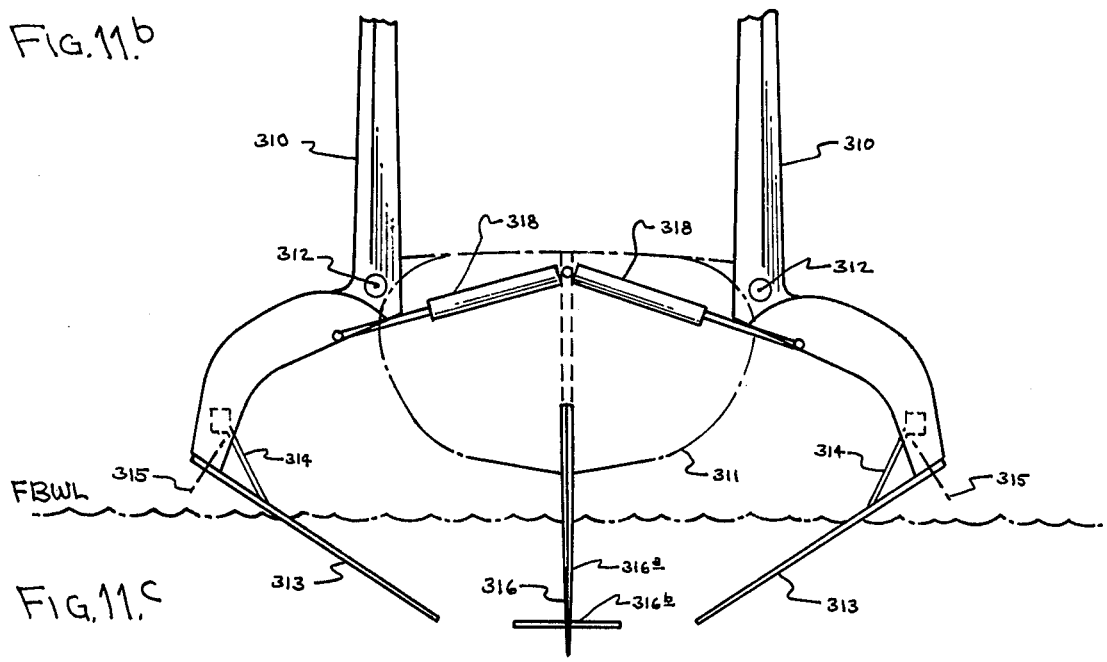
FIG.11.b
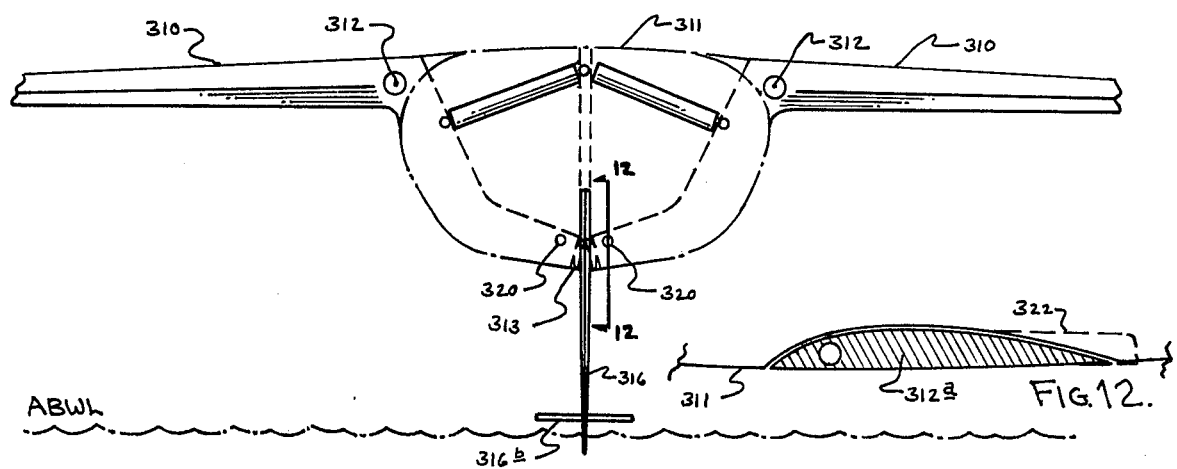
FIG.11.c
FIG.12.

FLYABLE HYDROFOIL VESSEL

BACKGROUND OF THE INVENTION

This application is a continuation-in-part of my earlier application Ser. No. 611,158, filed Sep. 8, 1975 and entitled "Flyable Hydrofoil Vessel", now abandoned.

This invention relates generally to hydrofoil type vehicles, and more particularly concerns high-performance craft capable of achieving hullborne, foilborne and airborne configurations.

Despite rapid and significant developments in air and land-based transportation, advancement in marine systems has been slow in coming. Hydrofoils, hovercraft and surface effect ships, are as yet far from being perfected for commercial or private-pleasurecraft application. Only now are some of these concepts being employed by the military at relatively high acquisition and operational costs. Many advanced vehicles produce unique and sometimes desirable performance characteristics, while others make little improvement over basic displacement craft. In those instances where performance is increased, it is often offset by increased system complexity and operating costs. The performance of current, advanced marine vehicles still falls short of providing the fast, safe and economical transportation necessary for real growth in the industry.

The growing demand for improved land-based transportation should stimulate and encourage the utilization of coastal and inland waterways. To accomplish this it will be necessary to develop vehicles that can close the speed gap between boats and aircraft, (performance between 50 and 250 mph). Hydrofoils and hovercraft have done this in part, but at the expense of other important considerations. High performance hydrofoils require sophisticated electronics for height-sensing and stabilization. Simpler systems do not produce the high level of speed and comfort required. Additionally hydrofoils may always be plagued by debris, erosion and limited ultimate speed. Hovercraft do not face the same restrictions on speed, but have inherent complexities in control and propulsion systems. Operation from conventional ports and marinas is complicated by noise, spray and dust pollution as well as by a rather bulky vehicle configuration.

SUMMARY OF THE INVENTION

The vehicle and systems described herein provide high-speed, surface transportation in a marine or comparable environment where sustained operation in ground-effect is possible. The vehicle uniquely interfaces several proven principles, and utilizes three basic modes of operation:

1. Hullborne
2. Foilborne
3. Airborne

Generally, mode selection is based upon the desired speed and environmental conditions, and the vehicle is automatically configured for optimum performance in any speed selected. The following summarizes such modes of operation:

Hullborne: In hullborne mode the vehicle functions as a normal displacement craft. Unlike conventional craft, however, the vehicle hull above and below the waterline is developed for maximum hydrodynamic and aerodynamic efficiency. Depending upon vehicle size, propulsion in this mode may be through an auxiliary system. Hullborne speeds will range from zero to thirty miles per hour.

Foilborne: A unique radial hydrofoil system is provided as an integral part of the vehicle hull. The retracted foil system is housed substantially within the hull, and the system may be deployed during hullborne operation. Transition to foilborne mode is a function of forward speed, and the hydrofoil system is capable of re-configuring itself for optimum efficiency as speed increases. Operation in foilborne mode would normally utilize the main propulsion system, and depending on vehicle size, produce speeds between 15 and 70 mph.

Airborne: Transition from foilborne to airborne operation can be automatic, as a function of forward speed, or driver-controlled. The main propulsion system is used and airborne speeds will range from 50 to 200 mph or more depending upon airfoil configuration. Transition utilizes the airfoil and hydrofoil system in combination to achieve a "flight" configuration. Stability is maintained in each mode automatically, allowing "hands-off" operation even during transitions.

Transition from airborne to hullborne mode may be accomplished automatically by reversing the procedure and reducing the speed. Emergency landings and quick stops are possible and are discussed in a latter section. The length of time required for the vehicle to make a transition from rest (hullborne) to airborne is a function of available thrust. Reconfiguration of the vehicle for a specific mode is caused by the vehicle's forward movement through the water or air. No other powered systems are necessary for the normal movement of primary functional elements.

These and other objects and advantages of the invention, as well as the details of an illustrative embodiment, will be more fully understood from the following specification and drawings, in which:

DRAWING DESCRIPTION

FIG. 3a is an elevation showing an alternative stabilizer arrangement and additional details at the craft nose, and FIG. 3b is an elevation showing the alternate stabilizer at the craft tail;

FIGS. 5a and 5 are schematics showing controls;

FIGS. 10a – 10f are elevations showing main hydrofoil variations;

FIGS. 11a – 11c are schematic elevations, looking aft and lengthwise of a modified craft, and showing hydrofoil configurations in different modes; and FIG. 12 is a section on lines 12—12 of FIG. 11c.

DETAILED DESCRIPTION

The following sections review the concept, its functional components and systems applied to a thirty foot, commuter-type vehicle; however, the system is suitable for both smaller and larger craft and although the major elements of the concept will remain the same. Changes in airfoil, hydrofoil, control and propulsion system configurations, within the purview of the invention, can be made.

1.0 GENERAL CONFIGURATION

1.1 Hull

Hull construction will vary depending on vehicle size. Smaller craft may use a molded Fiberglass reinforced plastic (FRP) outer skin with integral walls and bulkheads of sandwhich construction. Advanced FRP laminates, foams, lightweight metals and composites may also be incorporated.

Design of the longitudinal hull 1 closely resembles an aircraft fuselage, devoid of the usual external marine decking and fittings. Hull surfaces below the waterline may be optimized for high-speed, low-drag displacement operation, including rapid take-offs and landings. A stepped design with a deep "V" configuration similar to seaplane hulls may be utilized. All windows, doors and similar openings as at 1a and 1b are typically flush with the outer mold line (OML) and sealed against the environment. The hull is watertight and designed to sustain complete submersion during foul weather or hard landings.

Figure 4A:
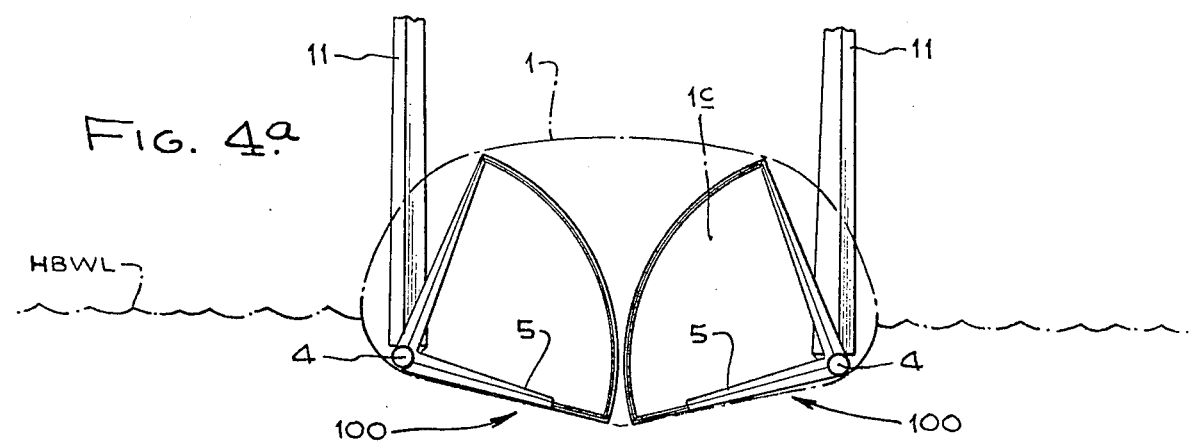
FIGS. 4a – 4c are schematic elevations looking aft and lengthwise of the craft, and showing hydrofoil configurations in different modes.

The aft portion of the hull incorporates on its underside, bays 1c for the retracted hydrofoils and auxiliary propulsion system as also are seen in FIG. 4a. The nose portion 1d houses the front foil/height-sensing system, and its retraction mechanism.

1.2 HYDROFOIL SYSTEM

1.2.1 Front Hydrofoil System

Figure 1:
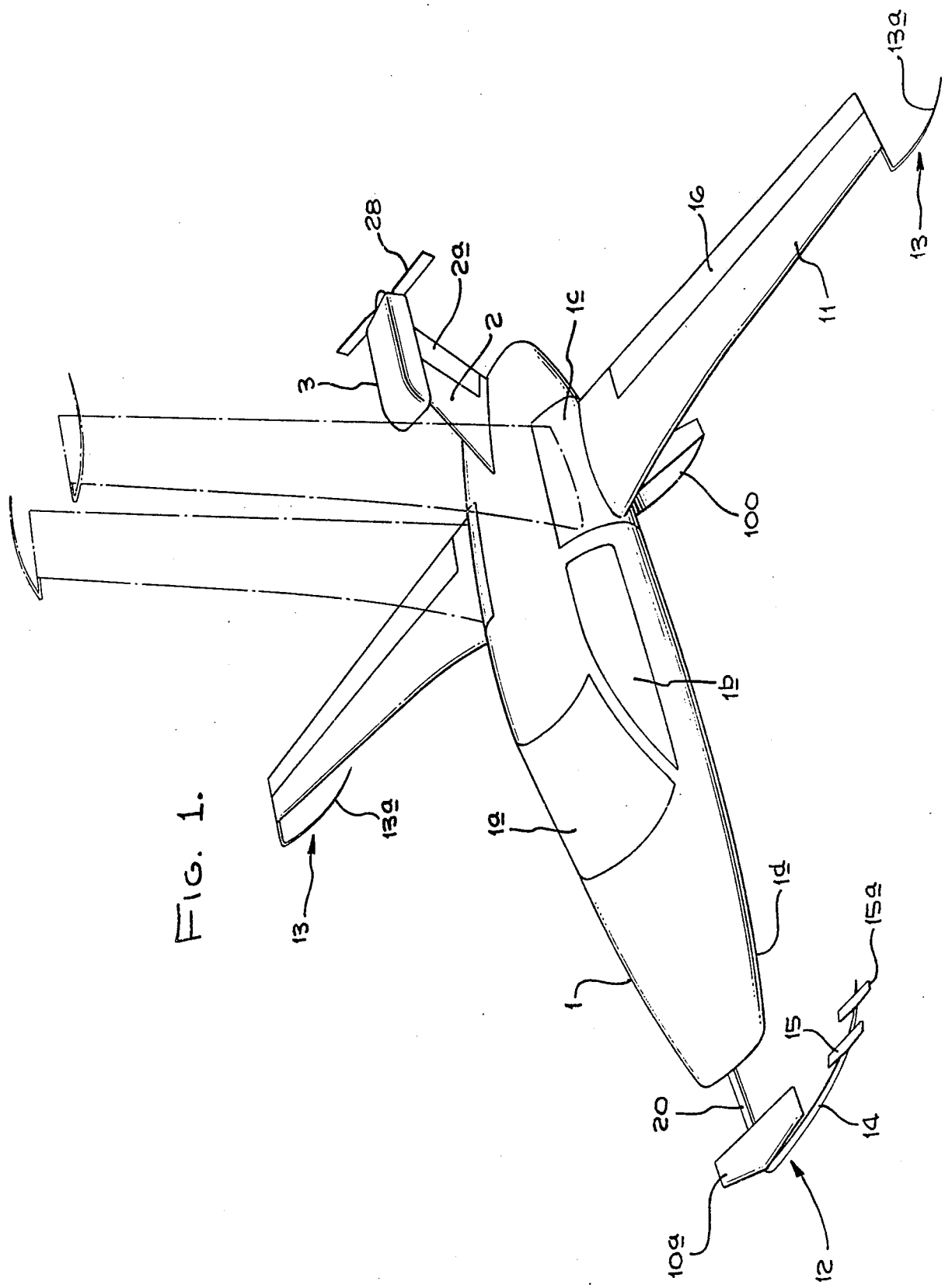
FIG. 1 is a perspective showing a craft incorporating the invention.
Figure 2:
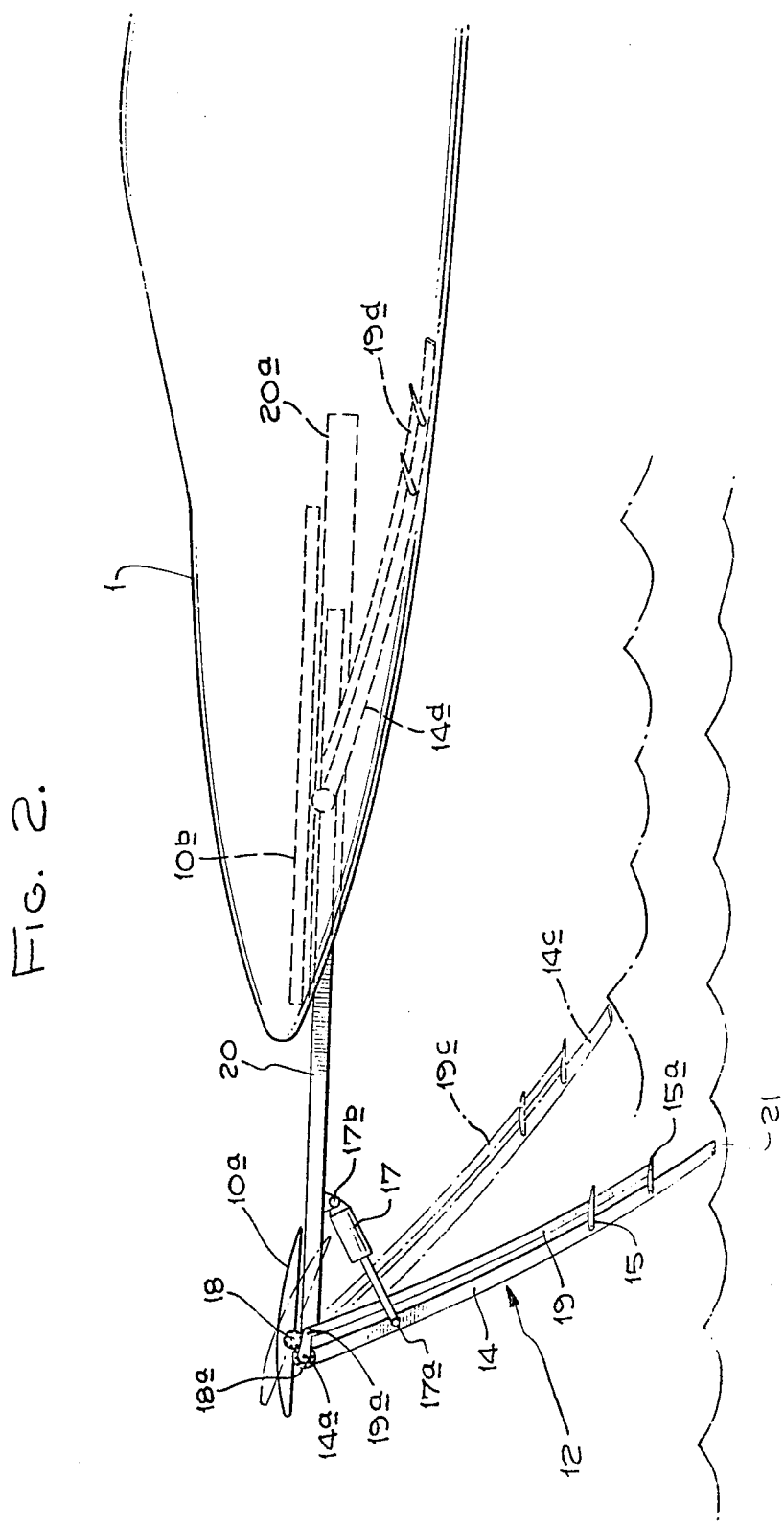
FIG. 2 is an elevation showing details at the nose of the craft.

Located in the nose of the vehicle is the front foil system and height-sensing mechanism 12, as seen in FIGS. 1-3. This assembly consists of a trailing arm 14 to which the forward hydrofoils 15 and 15a are attached. The arm is pivot connected at 14a to strut 20. Front foils 15 and 15a are of the fully-submerged type arranged in ladder configuration with a relatively low-speed, high-lift foil 15 above, and a high-speed foil 15a below.

Attached to the trailing arm at 17a is a telescoping hydraulic actuator 17, the latter also connected at 17b to strut 20. The assembly 12 acts as a shockmitigation system, absorbing impacts with floating logs or debris, and restoring the arm to its original position. The leading edge of the arm 14 is structured to act as a bumper, riding over and/or thrusting underwater floating objects. A second parallel arm 19, attached to hydrofoils 15, acts to keep the hydrofoils at the correct angle of attack when the system moves rearward on impact with an obstacle. Note the broken lines indicating a rearward position of the arm at 14c and 19c. The arms 14 and 19 may be suitably pivotally attached to the hydrofoils, and arm 19 may be pivotably connected to strut 20 at 19a.

Actuator 17 causes the trailing arm and foil system to retract upwards into a well on the underside of the hull for storage, as indicated by broken lines 19d and 14d. The trailing arm also serves as part of the emergency skid system which is discussed later.

The front foil system 12 can be lowered hydraulically, pneumatically, mechanically, or by water pressure acting on the foil surfaces. It can be raised by any of the same methods. Foil angle of attack and actuator extension can be controlled from the cabin for vehicle pitch and ride height. Importantly, the entire front foil system is linked mechanically to the canard airfoil 10a at the vehicle nose. The entire assembly is movable forward and back on horizontal strut or beam 20 for airfoil extension. A guide for the strut 20 appears at 20a. The airfoil 10a rotates 90° for storage within the hull, shown at 10b. Beam 20 may be moved in and out by a cable system or a screw device.

A canard hydrofoil configuration 15 and 15a acts as a suppressor to oncoming waves by creating a near homogeneous, non-erratic wake pattern for the more heavily loaded rear foils to operate within.

1.2.2 Rear Hydrofoil System

The aft hydrofoil system seen in FIGS. 4a–4c, 5 and 6 is an unusual radial design incorporating adjustable control surfaces and a variety of foil cross-sections. The system consists basically of two units or assemblies 100 each a quadrant, one right and one left, each including curved hydrofoil sections 7 and 8, and associated struts 6 and 5.

Each assembly rotates about a forwardly extending pivot axis 4 which provides for retraction and re-configuration in the foilborne mode, the two pivot locations being laterally spaced, as shown. Pivots 4a define axes 4, and are connected with the hull.

Position 1—Hullborne Operation (FIG. 4a)

In the retracted position, the rear hydrofoil system 100 is contained entirely within the vehicle hull. The high-lift hydrofoil/strut 5 of each unit 100, acts as a close-out for the foil storage bay, maintaining hull contours in the retracted position. The foil assembly is held in the retracted position by a locking assembly located adjacent to pivot 4a.

Figure 4B:
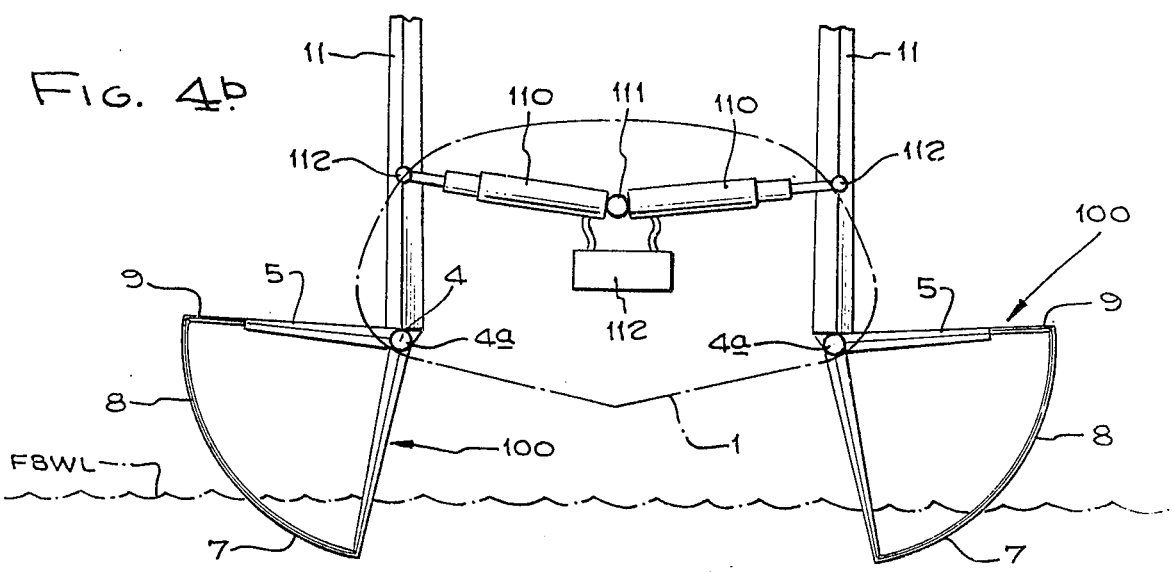

Position 2—Foilborne Operation (FIG. 4b)

Release of the retraction locking assembly allows the rear foil quadrants 100 to rotate downward around axes 4 and enter the water stream. This is normally done when the vehicle is in forward motion. Hydrofoil/struts 5 and 6 define movable control surfaces, or contain flaps for rotation about pivot axes 4. These surfaces are controlled from the cabin and are adjusted to a negative angle of attack for foil deployment. Foil/strut 5 enters the water stream first causing the foil quadrant 100 to continue downward and outboard, to lock in Position 2 (FIG. 4b). Use of the vehicle's forward motion and the water stream to extend and retract the foil quadrants eliminates the need for additional powered systems.

In Position 2, the rear hydrofoil quadrants 100 create a wide-based, surface-piercing hydrofoil configuration which is inherently self-stabilizing. For example, vehicle roll produces passive, counteracting righting forces by immersing additional hydrofoil section lifting surface into the water. Prior to take-off, the entire hydrofoil quadrant is submerged. Foil/strut 5 is a sub-cavitating, high-lift configuration surface which produces maximum lift at lower speeds. Incidence or flap angle is controlled from the cabin. Foil/strut 6 is also controlled from the cabin and in Position 2 provides hullborne and foilborne steering control. When right and left quadrant strut surfaces 5 and 6 are used in combination, (both surfaces in the same direction relative to the longitudinal vehicle centerline) movement about the vehicle's vertical axis is produced. In Position 2, with the water level as shown in FIG. 4b, struts 5 and 6 provide additional control about the vehicle's longitudinal axis, strut 6 reacting in the water stream, and strut 5 functioning at higher speeds as an airfoil to provide operator-controlled roll restoring forces. In the event of human error or mechanical failure, passive, fail-safe roll recovery is inherent in the surface-piercing system.

The movement of strut surfaces 5 and 6 are coupled during yaw, roll, and quadrant rotation, as will be described. If these surfaces are used in opposition to each other (one moving right and one moving left relative to the vehicle's longitudinal centerline), braking forces are produced. Speed brakes functioning in both water and air are available in Positions two and three. The foil/struts 5 and 6 are configured as anhedral lifting surfaces to facilitate added lift for rapid take-off from hullborne to foilborne mode, and cushion landings from both airborne and foilborne modes.

In the past, hydrofoil development has suffered from the design limitation of a two-to-one ratio between top end speed and take-off. In effect, if a vehicle is designed to take off at 20 knots, its top speed is often limited to the area of 40 knots. This is due to the use of fixed foil configurations and lifting surfaces. Highspeed, supercavitating foils have poor lift efficiency at low speeds and require excessive power for take-off. Sub-cavitating foils have high lift efficiency for take-off and cruise, but are very sensitive to the seaway and produce substantial drag as speed increases.

The system described herein utilizes both types of hydrofoil configurations, and provides for their interchangeability during "flight". Thus, the circumferential portion of the quadrant incorporates two or more hydrofoil cross-sections, in separate segments or blended into a single, continuous, curved span. These cross-sections are arranged so that the relatively high-lift sections are located at 7, and relatively high-speed sections at 8. With the foil quadrants locked in Position 2, (FIG. 4b), lifting surfaces leave the water as speed increases and less area is required. At normal Foilborne Waterline (FBWL), the quadrants can be rotated inward around pivot axis 4 causing high-drag sections 7 to leave the water, and high-speed (low drag) sections 8 to enter the water. This transition from low to high speed configuration takes place without interruption of lift on the hydrofoils. Quadrant rotation from Position 2 to Position 3 is typically accompanied by rotation of the main airfoils 11, as will be further described.

Figure 4C:
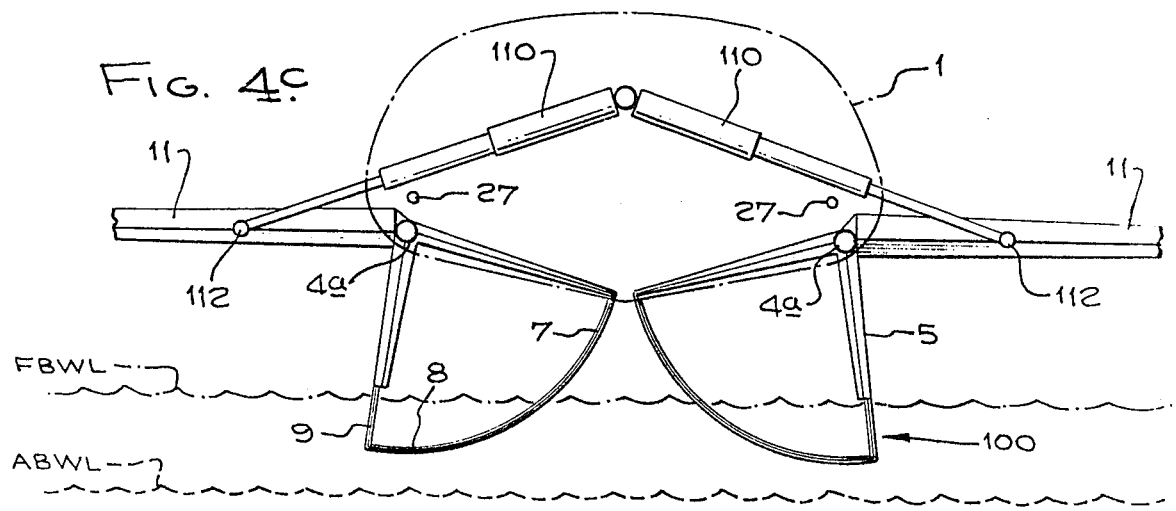

Position 3—Airborne Operation (FIG. 4c)

Transition from foilborne to airborne operation involves the simultaneous rotation of the rear foil quadrants 100 and the main airfoils, or wings 11. In airborne mode, the foil quadrant is rotated so that struts 6 act as close-outs, maintaining hull lines, and each strut 5 is positioned as an airfoil controlling movement about the vehicle's vertical axis. This configuration places the high-speed hydrofoil sections, 8 and 9 at the lower part of the assembly. In this location the comparatively thin foil sections 8 permit maximum speed for airborne transition, and minimum sensitivity to a choppy seaway.

The actuation of struts 5 produces braking forces as required, as well as forces for the rotation of the wings 11 around pivot axes 4 during transition from airborne mode back to foilborne mode (FIG. 4c back to FIG. 4b).

1.3 AIRFOIL SYSTEM 1.3.1 Front Airfoil/Airborne Height Sensing System

Located in the nose of the vehicle and functioning as an integral part of the front hydrofoil system as seen in FIG. 1, is a canard air-foil stabilizer 10a to control movements about the vehicle's lateral axis. The hydrofoil strut 14 pivots at the forward end of a telescoping beam assembly 20, which is mounted in the nose of the vehicle as previously described. Airfoil 10 and actuator 17 are attached to this member. Extension of beam 20 forwardly increases the effectiveness of the stabilizer 10a by lengthening its moment arm about the hull center of mass, and also moves the assembly from its storage bay in the vehicle nose, forward, into the air stream.

A geared sector 18a at the top of strut 14 interacts with a geared wheel 18 attached to the airfoil 10, causing the latter to move to a higher angle-of-attack when the strut rotates rearward. When strut 14 rotates forwardly the airfoil stabilizer moves to a negative angle-of-attack. Thus, movement of the strut 14 and airfoil 10a controls vehicle pitch and ride height over the water during airborne operation.

During hullborne operation, actuator 17 pneumatically, or hydraulically, lowers the front foil assembly 15 and 15a for take-off. Pressure in the actuator is adjusted to resist lifting loads generated by those foils, and to hold the nose at a constant height above the water. Airfoil stabilizer 10a during foilborne operation is positioned at a high angle-of-attack for take-off and transition to airborne mode. As the vehicle becomes airborne, foils 15 and 15a leave the water, relieving the lifting forces and allowing actuator 17 to extend, moving strut 14 downwardly and forwardly. The stabilizer then moves to a neutral angle-of-attack, maintaining vehicle height and providing corrective forces if the vehicle pitches up or down. On landings or on impacts with floating objects, strut and airfoil movement brings the vehicle to a nose-up attitude, cushioning landings and providing for a safe re-entry.

At the base of strut 14 is a small plate 21 to act as a feeler on the water surface. This component is designed to skim the surface with minimum drag. If the feeler is forced deeper into the water due to a nose down attitude, the drag produced causes strut 14 to move rearwardly, bringing the nose back up. More severe downward pitch causes one or both hydrofoils to produce lift, and the additional lifting forces maintain a high angle of attack of airfoil 10a until ride height is restored. Actuator 17 acts as a damper and system shock absorber. When feeler 21 contacts waves and surface chop, the damping action averages the impacts and smoothes the ride. Both the damping action and the relationship between strut angle and airfoil angle can be controlled from the cabin. Alternate configurations for the front foil and height sensing system 12 are discussed in a latter section.

1.3.2 Main Airfoil System

The main airfoils or wings 11 may be like those of an aircraft; however, they are carried to hinge about pivot axes 4 and rotate from a vertical storage position to a horizontal flight position. A relatively high aspect ratio is preferred for optimum performance in ground-effect. The wings are configured to provide an in-flight suspension system, substantially isolating the hull 1 from vertical accelerations of a rough seaway. Different types of wings configurations will be utilized depending upon the degree of speed or range desired.

Figure 6:
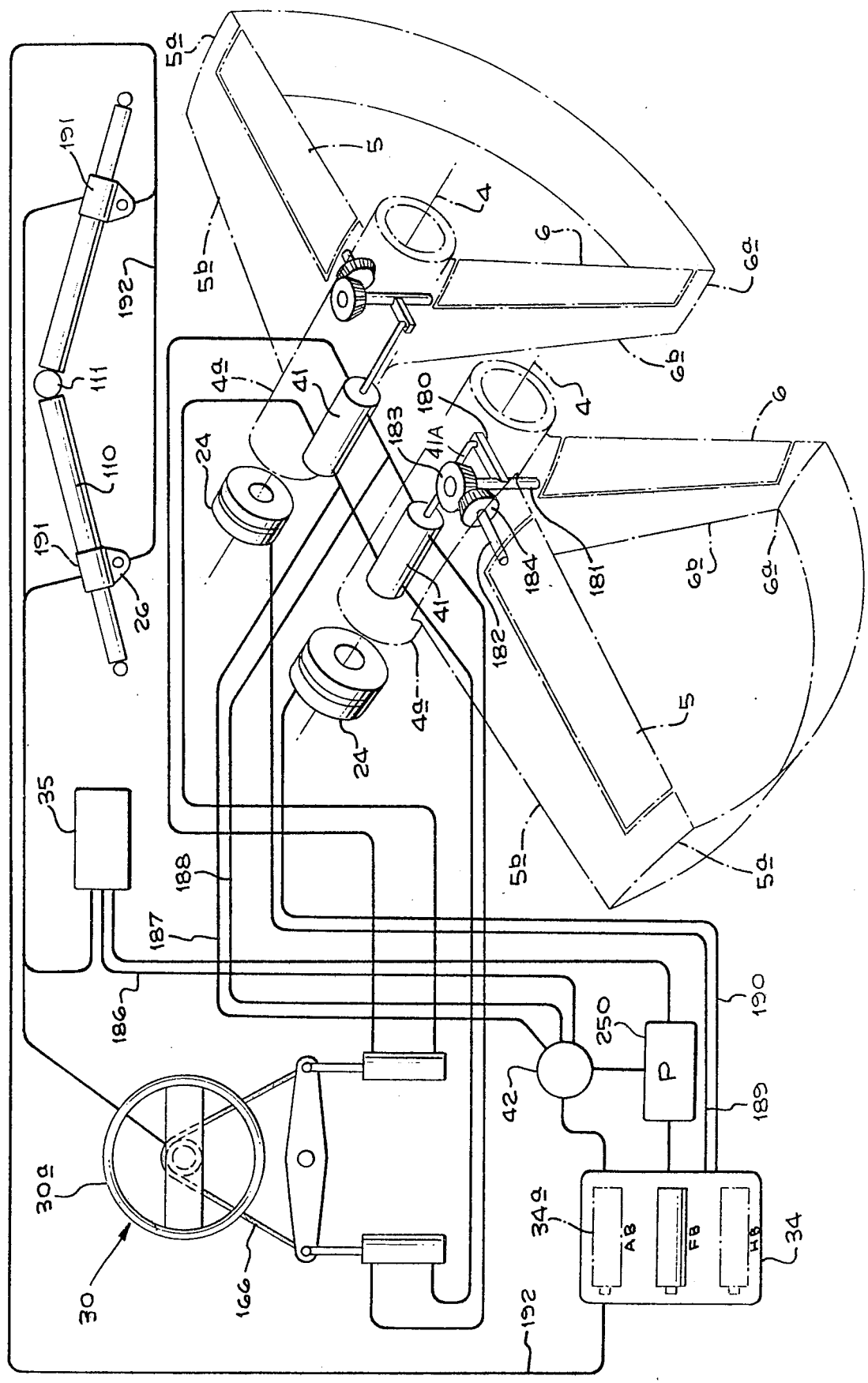
FIG. 6 is a schematic showing controls.
Figure 9:
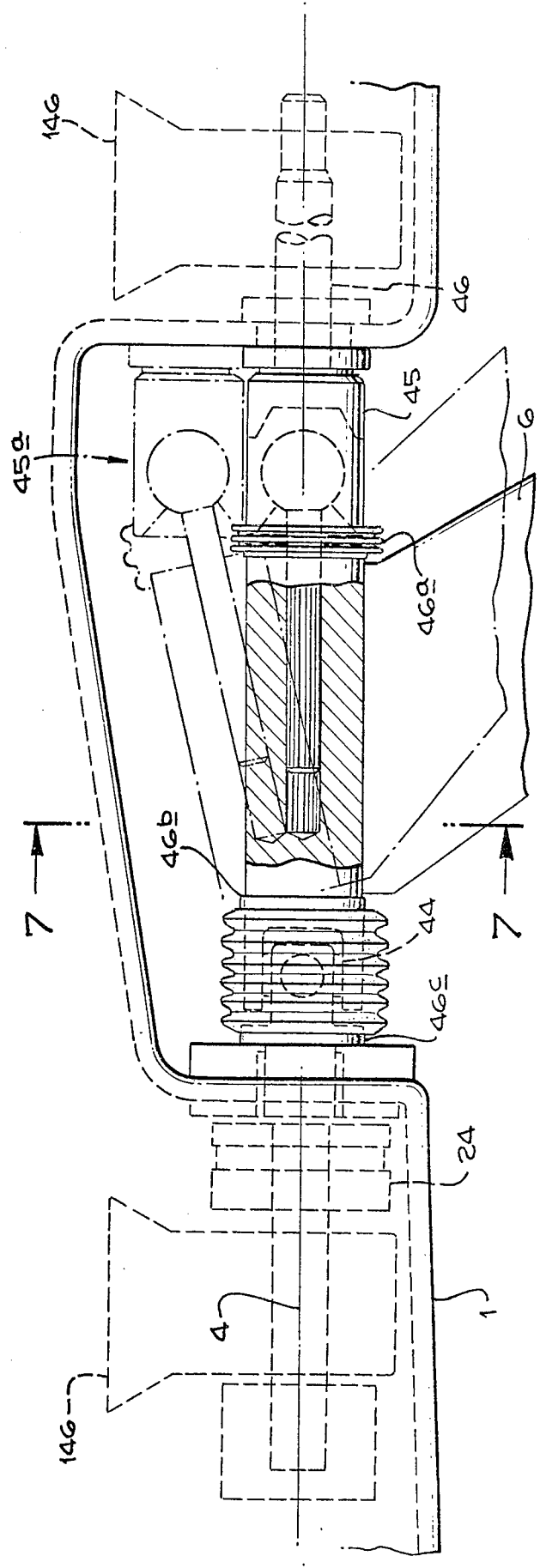
FIG. 9 is an elevation taken through the main hydrofoil axis depicted in FIG. 7.

As seen in FIGS. 1 and 5, full, trailing edge flaps 16 are incorporated on each wing for take-off, landing, and control about the vehicle's forwardly extending longitudinal axis in airborne mode. To provide automatic roll control and height sensing, an arm and feeler system 13, similar to that in the vehicle nose, is incorporated into the tip of each wing. If a wing tip drops below selected height, arm 13a is moved upward by the seaway, the flap 16 is moved down, providing roll restoring forces. Movement of arm 13a is transmitted to the flap via a pushrod assembly 23. A damper/actuator 22 carried in the wing, is incorporated into the system which averages and smoothes feeler contact with the seaway, and permits independent flap/aileron control from the cabin. Actuator 22 is connected at 22a to the pushrod, and the latter is connected to arm 13a and to flap 16 via crank 23a. At the wing root is a hinge assembly for rotation about pivot axis 4. Incorporated into the hinge is a clutch (24), as seen in FIGS. 6 and 9, for indexing and locking the associated foil quadrant 100 in the retracted or foilborne position. The clutch is constructed to stop and secure the foil quadrant at intermediate positions if required. Once the foil quadrants are locked in foilborne configuration, FIG. 4b, they continue their rotation to the high-speed position of FIG. 4c secured to the wing assembly, so that the wings rotate with the quadrants in moving from FIG. 4b to FIG. 4c positions.

Controlling and synchronizing wing rotation are heavy duty hydraulic/pneumatic telescoping actuators 110. One end of each actuator is attached to a pivot 111 on the hull centerline, and the other end to the main structural wing spar as at 112. Although the actuators can be powered for raising or lowering the wings, this is normally accomplished through wind and water forces acting on the airfoil and hydrofoil surfaces. As the wing is lowered to its horizontal position, a pin receptacle 26 attached to the end of the fixed (cylinder) portion of the actuator 110 engages with locking pin 27, attached to the hull. Latching can be automatic or operator controlled.

An important function of the wing actuator 110 is to ensure that each wing is lowered and raised simultaneously and at the same rate, unless otherwise desired. Control valves as indicated at 112 in FIG. 4b, permit the wings to be locking at any point during their rotation. This feature provides an important control function during transition to or from airborne mode. The wings are arranged to provide counterbalancing and stabilizing forces about axis 4 during hydrofoil rotation. If, during transition, a hydrofoil flap enters a wave or swell causing increased rotational forces, the wing through its substantial moment arm and trailing edge flap can dampen and restrain such forces. The vehicle is designed to permit emergency transitions from air to foilborne mode. This involves the rapid movement of the wings from the horizontal to vertical position, and during this movement, actuators 110 absorb shock and cushion each wing at the end of its travel.

1.4 PROPULSION SYSTEM

1.4.1 Main Propulsion System

The main propulsion can be used in any of the three vehicles modes, but is designed primarily for high-speed operation. A variety of propulsion systems can be efficiently utilized in the proposed vehicle. The thirty foot craft is typically driven by an air propeller 28 and powered by an air-cooled light aircraft engine 3 placed at the extreme rear of the vehicle, atop a vertical stabilizer 2. See FIGS. 1 and 3b in this regard. This location provides good engine cooling and exposure to the air stream, as well as isolating the passenger compartment from engine noise, vibration or accidental fire. The installation provides for powerplant interchangeability and ease of service and repair. Optimum reliability and light weight is achieved through direct drive and the avoidance of lengthy driveshafts, angle drives and special tranmissions.

The primary engine control function with respect to vehicle operation is throttle setting. The engine may be started and stopped from the cabin. Reversible pitch propellers can be installed, however vehicle backing and braking are typically performed by other systems. Additional or alternate airfoil surfaces for controlling vehicle pitch and/or yaw may be incorporated as shown in FIG. 3b or aft of the propeller.

1.4.2 Auxiliary Propulsion System

An auxiliary powerplant and water propeller drive may be employed for hullborne operations. Equipment may be in the form of conventional lightweight outboard or inboard/outdrive outdrive units commercially available. A special bay in the aft hull will allow the auxiliary system to retract within the hull for foilborne or airborne operation. The auxiliary powerplant may be started, stopped, raised and lowered remotely from the cabin. The unit typically incorporates a reversible drive for backing and maneuvering.

1.4.3 Wind Propulsion

For powerless hullborne operations, it is anticipated that substantial thrust can be generated through the use of the wings 11 and flaps 16, in a vertical or near-vertical position, in the wind stream, as seen in FIG. 4a. The wings may be displaced about the vehicle's centerline symmetrically or asymmetrically, and secured in position with extender 110. Wind forces at the wings are reacted beneath the waterline through the rear foil system. In this configuration both propulsion and roll control are possible.

1.5 Vehicle Control Systems

1.5.1 Operator Controls/General Configuration

Operator control inputs are designed to be the same for all modes of operation. They are arranged functionally, much like an automobile. As seen in FIGS. 5 and 6, steering wheel assembly 30 positioned in front of the driver is turnable to control yaw and roll in all modes, and moves forward and aft for pitch control in foilborne and airborne modes. Assembly 30 includes yaw wheel 30a and roll control wheel 30b, as seen in FIG. 5a. Adjacent to the driver's seat, generally integrated into the operator's outboard armrest, are the throttle and mode selector controls, the latter shown at 34. These may be interlocked for simultaneous operation. On the driver's floor is a foot brake 35 for vehicle slowing and emergency stops. Other controls are more flexible in their location and configuration.

1.5.2 Control Functions/Hullborne Mode

1.5.2.1 Propulsion

Located near the steering assembly (generally part of the same unit) is a lever 31 for lowering the driving element of the auxiliary propulsion system, and simultaneously engaging its steering controls with the vehicle's main steering system. Integral with this control is an auxiliary powerplant ignition, start/stop.

Adjacent to the operator's seat is a sliding throttle lever and transmission selector 32 for control of the auxiliary system. Conventional marine remote controls may be used with this system if desired.

1.5.2.2 Control

The main steering assembly 30 incorporates a full steering wheel 30a for yaw control, and a pair of small handles 30b outboard, to the right and left of the wheel for roll control. Roll forces created by the movement of wing flaps 16, can be induced independently of yaw control by moving the handles about the steering wheel in the desired direction of roll. Hullborne roll control utilizes the main airfoils 11 in the vertical position and relies upon relative wind and/or forward speed.

Yaw forces can be induced independently or include roll through movement of the main steering wheel 30a. The ratio of roll to yaw may be varied. Hullborne steering is accomplished through a movable rudder/propeller (a conventional outboard or inboard/outdrive) linked directly to the steering controls.

1.5.3 Control Functions/Foilborne Mode

1.5.3.1 Propulsion

Adjacent to the driver's position is a second throttle control 33 for the main propulsion system, as seen in FIG. 5. Movement of the throttle lever forward increases speed, and rearwards decreases speed. A water and air-speed indicator may be used to show vehicle speed and indicates appropriate mode transition points.

1.5.3.2 Mode Selection

The mode selector 34, permits manual transition control during vehicle forward motion. The sliding lever 34a has three primary settings corresponding to the three basic modes of operation. The rearmost position is hullborne, the forward position, airborne and the mid position, foilborne. The amount of manual pressure applied during movement of the control lever determines the degree of control surface actuation, and therefore the speed of transition from one mode to another. Reversal of movement of the selector lever 34a reverses the transition. Rapid transitions to low-speed modes may automatically include reduced throttling. Transition to high-speed modes must be preceded by an increased throttle setting.

1.5.3.3 Control

In the foilborne mode, vehicle control combines both aerodynamic and hydrodynamic control surfaces.

Pitch—Control about the lateral axis while foilborne is accomplished primarily with the forward hydrofoil system, although the rear foil surfaces 5 can provide some pitch control during take-off. As seen in FIG. 3a, movement of the forward foils 15 and 15a is controlled from the cabin by movement of the steering assembly 30 forward and aft.

An air-speed detector 37 employing pitot 37a, in the pitch control system, determines the most effective means of vehicle pitch control (airfoil or hydrofoil). This unit controls a hydraulic switch 38 which directs pitch commands from the steering assembly 30 to either the airfoil or hydrofoil control surfaces. At lower speeds hydraulic pressure is applied from source 150 via switch 38 and line 39 to actuator 151 which pivots crank 152. The latter is connected via link 19 with front hydrofoils 15 and 15a to pivot them about the axes of their pivot connections to strut 14, i.e. at locations 154 and 155. This causes the front hydrofoils 15 and 15a, or other hydrodynamic surfaces if required, to change angle of attack. This angle change causes increased or decreased lift on the front foil system, raising or lowering the vehicle nose. Loads from the forward foils are reacted through struts 14 and 19 and actuator 17.

At higher speeds (generally during airborne operation) pitch commands are switched at 38 to cause hydraulic pressure transmission through line 40 to actuator 17. In FIG. 2, the airfoil assembly 10a and 14 are linked mechanically so that extension of actuator 17 causes the airfoil to move into a vehicle nose-down attitude. Retraction of the actuator 17 causes the airfoils to increase angle of attack to a vehicle nose-up attitude. In alternate configuration FIG. 3a and FIG. 3b, pitch commands are delivered to actuator 17 in the same manner, however, movement of the rear horizontal stabilizer 10a is accomplished hydraulically rather than mechanically. Movement of actuator 17 and arm 14 causes actuator 200 to transmit hydraulic pressure through lines 201 to actuator 203. Actuator 203 controls the movement of elevators 204 on stabilizer 10a giving the vehicle a nose-up or nose-down attitude.

A hydraulic ride-height control 36 allows the position of strut 14 to be adjusted from the cabin. Increased pressure from the control and transmitted via line 160 to actuator 17 increases the vehicle nose height, and decreased pressure reduces nose height above the water surface. This action provides trim control for operation under different payload and sea-state conditions.

Roll—Control about the vehicle's longitudinal axis during foilborne operation can be maintined through both the main hydrofoil and airfoil systems. As seen in FIG. 5, flaps 16 on the wings 11 are controlled by rotation of the roll levers 30b on steering assembly (30). Such rotation is transmitted via cable 166 and and bellcrank 167 to pistons 168 in actuators 169. Fluid is transmitted via lines 170 and 171 to actuator 22 in one wing, and via lines 172 and 173 to actuator 22 in the other wing. Actuators 22 pivot the flaps 16 as via links 23 and cranks 23a. The flaps are operable with wings in the vertical (stowed) position, the horizontal position, or when locked in intermediate positions. Additional roll control is produced through the main foil system during yaw motion.

Yaw—Control about the vehicle's vertical axis during foilborne operation is produced through the movement of surfaces 5 and 6 of the main hydrofoil system. See in this regard FIG. 6. With the main foil quadrants locked against rotation, both roll and yaw forces are produced by movement of the steering wheel 30a. An hydraulic actuator 41 located adjacent to pivot axis 4 produces movement of surfaces 5 and 6 which may be synchronized mechanically. Thus, actuator plunger 41A extends to rotate crank 180, turning shaft 181 of surface 6; also, rotation of shaft 180 turns shaft 182 of surface 5 via meshing gears 183 and 184 on the shafts.

Braking forces are produced when right and left foil surfaces 5 and 6 are used in opposition. Force applied by the operator to brake pad 35 directs electrical signals via line 186 to switch valve 42 and to pump 250, which transmits to actuators 41 via lines 187 and 188.

With locking clutches 24 dis-engaged from pivot elements 4a, the foil quadrants are free to rotate to and from the retracted position. Electric current from mode selector 34 is fed to the clutches via lines 189 and 190. Control inputs from mode selector 34 direct hydraulic pressure through switch valve 42 to actuators 41, producing foil control surface movement and thus, quadrant rotation.

1.5.4 Control Functions/Airborne Mode

1.5.4.1 Propulsion

Propulsion in airborne configuration is typically normally the same as that for foilborne operations. There may be exceptions to this in larger vehicle sizes.

1.5.4.2 Mode Selection

Transition from foilborne to airborne mode is also controlled from selector 34. Clutch assemblies 24 remain locked holding foil quadrants in a fixed relationship to the wing. Movement of the selector lever 34a towards the airborne position transmits electrical signals via line 192 to locking valves 191 in hydraulic actuators 110, allowing the wings and foil quadrants to rotate about pivot axes 4. On completion of rotation, wing actuators 110 engage with locking pins 27 to complete the airfoil load-carrying structure. Movement of the selector lever back towards the foilborne position electrically dis-engages the locking pins, and effects hydraulic pressure transmission via line 188 to actuators 41 causing surfaces 5 and 6 to move to the extended position. The combined forces of wind acting on flaps 16 and water acting on hydrofoil surfaces 5 and 6 cause wing/foil rotation without a requirement for powered systems.

If yaw roll or braking control forces are introduced during wing/foil rotation, control inputs at 30 electrically actuate locking valves 191 in actuators 110 so that forces can be reacted through the vehicle.

1.5.4.3 Control

Pitch—Airborne pitch is automatically controlled through the nose height sensing system. Movement of trailing strut 14 controls the airfoil stabilizer 10 as previously described and maintains vehicle neutral attitude and ride height at design sea-states. Impacts with obstacles or with the seaway, as well as down drafts at the bow, produce counteracting, nose-up corrective forces.

Airborne pitch and low altitude climb can be initiated by the operator with forward/aft movement of steering assembly 30. Normal transition from hydrofoil to airfoil stabilization is accomplished automatically through hydraulic switching of control inputs in the pitch system. Manual override of automatic control in either of these modes is possible to permit more rapid take-off. Rearward pressure at the steering control 30 produces a nose-up attitude, increasing angle of attack of both the main hydrofoil and airfoil system. At the same time, movement of airfoil 10a to a nose-up attitude, will retract the entire front foil system away from the water producing a lower drag configuration.

Forward pressure on the pitch control reduces the angle of attack at airfoil 10a and produces a downward aerodynamic force at the vehicle nose, (or upward force at the vehicle tail as in FIG. 3b). This movement extends strut 14 and the front foil system downward to act as a fail-safe limiting force in the event of pitch over-correction. Hydrofoils 15 and 15a are designed so that they cannot attain a negative angle of incidence.

The alternate configuration for the airborne pitch system involves placement of the airfoil stabilizer at the top of the vehicle vertical tail surface 2 as indicated in FIG. 3b, and may be either forward or aft of powerplant 3. In this location it is linked to the height sensing system either hydraulically or mechanically as indicated generally at 201 and interacts functionally in the same manner.

Roll—Airborne control about the vehicle's longitudinal axis is automatic when the wings 11 are locked in the extended (horizontal) position. Automatic stabilization is maintained through the feeler system, with arm 13 controlling the movements of the wing trailing edge flaps 16 as via links 23 and 23a, as seen in FIG. 5.

Manual control can be initiated by movement of the outboard control handles 30b on steering assembly 30. This movement is transmitted hydraulically as previously described to the actuators 22 in each wing, which control independent movement of flaps 16. Signals from mode selector 34 direct hydraulic pressure via switch valve 43 to actuators 22 for wing extension and retraction.

Yaw—Airborne steering is accomplished with the same control surfaces used for foilborne control about the vertical axis. Actuators 41 provides movement of foil surfaces 5, which is the airborne configuration serve as airfoil rudders generating yaw forces.

1.6 Emergency Systems

1.6.1 Hard Landing System

An emergency, hard-surface landing system is incorporated as an integral part of the vehicle. The system consists of a three-point skid assembly, comprising the front height-sensing arm 14, and the struts of the rear main hydrofoil quadrants 100. During airborne and foilborne operation, the system is deployed in anticipation of dry landings or impacts with waterborne objects which might otherwise damage the hull or hydrofoil surfaces. The front strut 20 supports the vehicle's nose on hard landings, with the leading edge of arm 14 functioning as a bumper, and actuator 17 absorbing impacts. See FIG. 2.

A rear hydrofoil suspension system (FIG. 6), permits the foil quadrants to move rearward and up on contact with objects or with the bottom in shallow water, or dry land. The tips 5a and 6a and leading edges 5b and 6b of struts 5 and 6 are structured to withstand occasional impacts without damage to the remainder of the control surface, On impacts, the hydrofoil strut moves rearward, causing the quadrant to pivot about universal joint 44 as seen in FIG. 9. Upward motion (see broken lines 45a) is guided and limited by control arm 45, energy is absorbed, and foil position is restored by torsion bar 46. The quadrant is secured torsionally through clutch 24. The universal joint and the control arm assembly are suitably sealed against the seaway, as at 46a, 46b and 46c. Wing hinges appear at 146.

The hard-landing feature of the hydrofoil system is intended for emergencies only. It is conceivable that more sophisticated versions, however, could be fitted with wheels for routine, dry land operations.

1.6.2 Main Airfoil Shear System

The vehicle wings 11 are typically designed to shear just outboard of the wing root and extender attach point 112, in the event wing tips or structure impact an immovable object. If a wing is lost, electrical and hydraulic circuitry causes the opposite wing and the remaining root assembly to move rapidly to the vertical (stowed) position. This action compensates for the imbalance of lift laterally, and rotates the main landing hydrofoils into position for emergency re-entry.

1.6.3 Powered Wing Retraction

An auxiliary system may be incorporated to restore the main airfoils 11 from a horizontal to the vertical position. This system would utilize wing actuators 110, and could function with the vehicle dead in the water.

1.7 Interior Accommodations

The thirty foot vehicle is essentially a commuter type craft. The passenger compartment is configured much like an automobile, with seating for four or five. Rear seating is modular and can be substituted for additional baggage capacity, toilet and galley facilities, or fuel for increased range. Sleeping accommodations become available by folding interior seating. Large craft will have provisions for more comfortable travel. The concept lends itself well to high-density passenger transport, similar to present yachts or airliners, as well as cargo versions equipped to handle containerized freight, automobiles or liquid petroleum products.

2.0 Vehicle Operation

2.1 Hullborne Operation

Entry to the vehicle cabin is via an opening in the overhead. A smaller hatch is contained within the main door for foul weather operation. A boarding ramp is incorporated as an integral part of the main cabin door.

2.1.1 Propulsion

Initial maneuvering generally involves the auxiliary power system, which is started, engaged and controlled with levers 31 and 32. Hullborne steering is via the primary vehicle control, 30. In rough seas and high winds, hullborne, roll can be largely controlled through the airfoil system.

2.1.2 Transition to Foilborne Mode

Hullborne speeds are quite sufficient for the deployment of the foil system. Movement of selector lever 34a forward simultaneously releases the front and rear foil systems for extension into the water stream. The forward system is brought to the pre-selected ride height via hydraulic pressure at actuator 17, and the rear system falls under gravity into the water stream when clutch 24 is electrically dis-engaged. The pitch of foil surfaces 5 and 6 cause the quadrants to rotate underwater locking automatically in the outboard, foilborne position. The greater the force applied at lever 34a, the greater the hydraulic pressure at actuators 17 and 41, and the faster the transition is completed. A lighted, graphic display indicates transitional stages as they occur, and confirms the locking of main and nose foils into position.

2.2 Foilborne Operation

2.2.1 Propulsion

Before take-off, the main propulsion system must be started and the vehicle brought to the required speed range. Both the main and auxiliary propulsion systems may be used during take-off, but the auxiliary system should be shut-down and retracted as the hull leaves the water to avoid unnecessary aerodynamic drag and hydrodynamic drag.

2.2.2 Control and Stability

Take-off is achieved automatically as speed increases. Hydrodynamic drag is progressively reduced as the front foils, in ladder configuration, and the rear surface-piercing foils require less lifting surface. Take-off can be a accelerated by pitching the vehicle nose up to increase angle of attack in the rear foils, while simultaneously adding thrust. Nose up pitch may be manually initiated during operation to clear larger waves or swells. At all speeds during transition and foilborne operation, roll stability is automatically maintained. If the vehicle rolls right, more of the right surface-piercing foil enters the water to provide roll restoring forces. The same corrective action occurs if the vehicle enters a wave or swell. Roll correction during foilborne operation can be initiated manually at control 30, which acts through struts 5 and 6 on the main foil quadrants, and through flaps 16 on the wings. Yaw is manually controlled through steering assembly 30, which operates struts 5 and 6 on the main foil quadrants. In the foilborne configuration, strut 6 acts as a water rudder to provide vehicle steering.

2.2.3 Braking

Braking forces during foilborne operation can be applied manually by pressure on pad 35. This action moves strut surfaces 6 to an outward angle of attack relative to the vehicle centerline, and the hydrodynamic drag produced rapidly decelerates the vehicle. Struts 5 and 6 are linked mechanically, so strut 5 automatically moves to a positive, high-lift angle of attack during braking, for a safe re-entry. Braking action is normally accompanied by a reduced throttle setting or propeller pitch.

2.3 Airborne Operation

2.3.1 Propulsion

Propulsion during airborne operation is normally the same as that used on foils. The vehicle speed must be increased to a point suitable for transition from the seaway.

2.3.2 Transition to Airborne Mode

2.3.2.1 Main System

Transition from hydrofoils to airfoils is essentially automatic, as the result of increased forward speed. Control 34 is again used to initiate transition. Movement of the lever to the airborne position applies hydrualic pressure to actuators 41 controlling the foil quadrants, and to actuators 22 which control wing flaps 16. Strut surfaces 5 and 6 are moved to an angle of attack which cause the quadrants to move inward, towards the retracted position. Both clutch assemblies 24 remain engaged, however, and torsional loads from the foils are transmitted through pivots 4a to the wings. Simultaneously, hydraulic valves in wing actuators 110 open, permitting flaps 16 to begin wing movement towards the horizontal position. Hydrodynamic and aerodynamic drag is minimized during extension as forces are translated into rotational movement.

During foilborne operation, the lower portion of each strut 6, and area 7 of the curved position of the quadrant is submerged. As rotation begins, additional curved hydrofoil surface is immersed in the water. At approximately 50% rotation, both areas 7 and 8 are immersed, the additional lift offsetting any added drag moment high above the waterline. As the airfoils move to the horizontal position, the high-lift foil sections 7 leave the water. At the completion of rotation, only the high-speed sections of the foil quadrants remain in the water, as seen in FIG. 4c.

The system is designed so that during rotation a more effective foil cross-section is continuously inserted into the water without interruption of lift. Reduced drag and increased speed thus enable take-off at minimum power settings. In full airborne operation, the entire main foil system is out of the water.

Wing actuator 110 controls and matches the rate of rotation for each airfoil, as well as acting as a damper during transition. If roll or yaw control inputs are required, valves in actuators 110 lock the wing and foil assemblies so that control surface movements can be reacted through the vehicle.

As the wings rotate to the horizontal position, feeler 13 at each wing tip (FIG. 5) is extended fully outward from the wing surface. Contact with the water by the feeler is made just prior to complete wing/foil rotation. On contact, water pressure moves the feeler upwardly causing flap 16 to move to a downward, lift-producing position. This action is timed to cushion and stop wing motion as the fully horizontal position is reached. At this point, the locking pins are engaged, and control surfaces on the wings and on foil struts 5 and 6 return to their neutral positions.

Struts 5 and 6 on the foil quadrants are designed to function both hydrodynamically and aerodynamically. During rotation a minimum hydrodynamic contact is maintained to assure positive control. As strut 6 leaves the water, strut 5 enters. Portions of the struts not in the water function as airfoils.

A safety feature may be incorporated to prevent accidental wings-down landings or wing tip impacts with the seaway, and also to provide automatic transition from airfoils to hydrofoils. This would involve a pressure switch in the hydraulic system at 43 which would react to pressure increases at actuators 22. In the event of inadequate air speed or a power failure during airborne operation, feelers 13 would be depressed through increased water contact, and would transmit signals to switch 43. At a pre-determined pressure the wing locking pins would release, raising the wings out of danger, simultaneously injecting the high-lift, landing foils into the water stream.

2.3.2.2 Nose System

Transition to airborne operation at the nose is also automatic, based on vehicle speed. Air speed detector 37 determines when there is sufficient air flow at the nose to permit full, safe aerodynamic lift and stability, and then switches pitch control inputs from the hydrofoils 15 and 15a, to the airfoil 10a. The pitch controls are hydraulic.

2.3.3 Control and Stability

Airborne control and stability in all vehicle axes is passive, but may utilize the same manual controls as those used in foilborne operation. Vehicle pitch and roll is controlled automatically through the nose and wing tip feeler system described in Section 1.5.4.3 Yaw is manually controlled through strut surface 5.

Roll stability during transition is passive in all stages of rotation, due primarily to the main foil quadrant design. Even at 50% rotation, any vehicle roll will immerse additional lifting surface to provide restoring forces.

As a safety feature, turns may be accomplished without the inboard wing tip dropping closer to the seaway. Banking for a left turn can be produced through movement of the right flap, while the left wing flap and feeler remain at a neutral position. This permits a normal operating height to be maintained on the left wing tip.

The airborne control system is designed to permit either manual or automatic pitch control during turning maneuvers. During banking, the pitch airfoil remains at a neutral positions until the vehicle returns to a horizontal attitude. This may be overridden manually. If, during a turn or other maneuver manual control is released, the vehicle will return automatically to straight and level flight.

2.3.4 Airborne Braking and Emergency Landings

Braking action during airborne operation is applied in the same manner described in Section 2.2.3. The pitch of foil strut surfaces 5 and 6 in opposition to each other, provides forces for the outward rotation of foil quadrants. In the event of an emergency landing requiring both rapid deceleration and wing retraction, the locking pins are released, and braking forces generated at struts 5 and 6 are used to restore the wings to their stowed position.

During emergency landings, extenders 110 absorb the shock of rapid wing movement to the vertical position. During this procedure, foil retraction injects a higher lift, higher-drag foil cross-section, smoothly into the water without interruption of lift.

2.3.5 Transition from Airborne to Hullborne Mode

Movement of the mode selector lever 34a from the airborne to the foilborne position causes simultaneous wing and foil rotation, configuring the vehicle for hydrofoil operation. The front height-sensing system returns automatically to hydrofoil control with a reduction in vehicle forward speed.

Further reductions in forward speed returns the vehicle to a hullborne mode. Once on the hull, the mode selector lever can be moved to the hullborne position. This releases clutches 24, and positions strut 5 and 6 control surfaces at a negative angle of attack, causing the foil quadrants to rotate inboard and up into the hull cavity where they are again locked in place by clutches 24. The nose foil system retracts as actuator 17 causes arm 14 to withdraw into its hull recess. The auxiliary propulsion system can now be deployed.

2.3.6 Emergency Flight

During airborne operation, it is possible for short periods, to become completely airborne for clearance of shipping or other obstacles. Back pressure on pitch control 30 brings the nose up and permits the vehicle to fly out of ground-effect at limited altitudes, for limited distances. To assist in obstacle clearance, feelers 13 and arm 14 move up and away from the surface as flaps 16 and stabilizer 10a move into a high-lift attitude. Special on-board instrumentation provides a continuous graphic display of obstacle clearance capability based on the vehicle's speed, wind and sea conditions.

2.3.7 Foul Weather Operation

The vehicle hull is clean hydrodynamically with complete water-tight integrity. In sea states too severe for airborne or foilborne operation, the vehicle may remain on its hull to ride out rough weather.

To provide added stability in heavy seas, the hydrofoils and/or airfoils may be deployed. The hydrofoils in the fully extended position provide roll control through struts 5 and 6 acting beneath the waterline. Substantial additional roll stability is available through the airfoil system. The wings may be used in their vertical position, or locked with extenders 110 at angles outward from the hull. In this configuration, flaps 16 provide roll recovery forces acting in the wind stream.

3.0 CONCEPTS VARIATIONS

3.1 Hull

Vehicle hull designs may vary widely. "V" type stepped designs are excellent candidates for smaller craft, however catamaran, tri-maran, twin-hull or large single hull configurations are also feasible. One variation that is applicable for large scale cargo operations, is a catamaran configuration with cargo modules suspended between the hulls. The containerized modules float out under their own power to be replaced by other units, without tying up valuable dock space. All hull designs, regardless of size, require optimum hydrodynamic and aerodynamic configurations because of the high operational speeds involved.

3.2 Hydrofoil Systems

A variety of hydrofoil configurations can be used front and rear, providing they are compatible with the basic operational systems of the vehicle. Either surface-piercing or fully submerged types can be employed using variety of cross-sections. Alternate configurations to the proposed main foil quadrant design are seen in FIGS. 10a–10f.

Other main foil designs which provide vehicle lift, wing rotational forces and configuration change during operation are feasible and are discussed below.

3.3 ALTERNATIVE PARALLELOGRAM HYDROFOIL ARRANGEMENT

Figure 7:
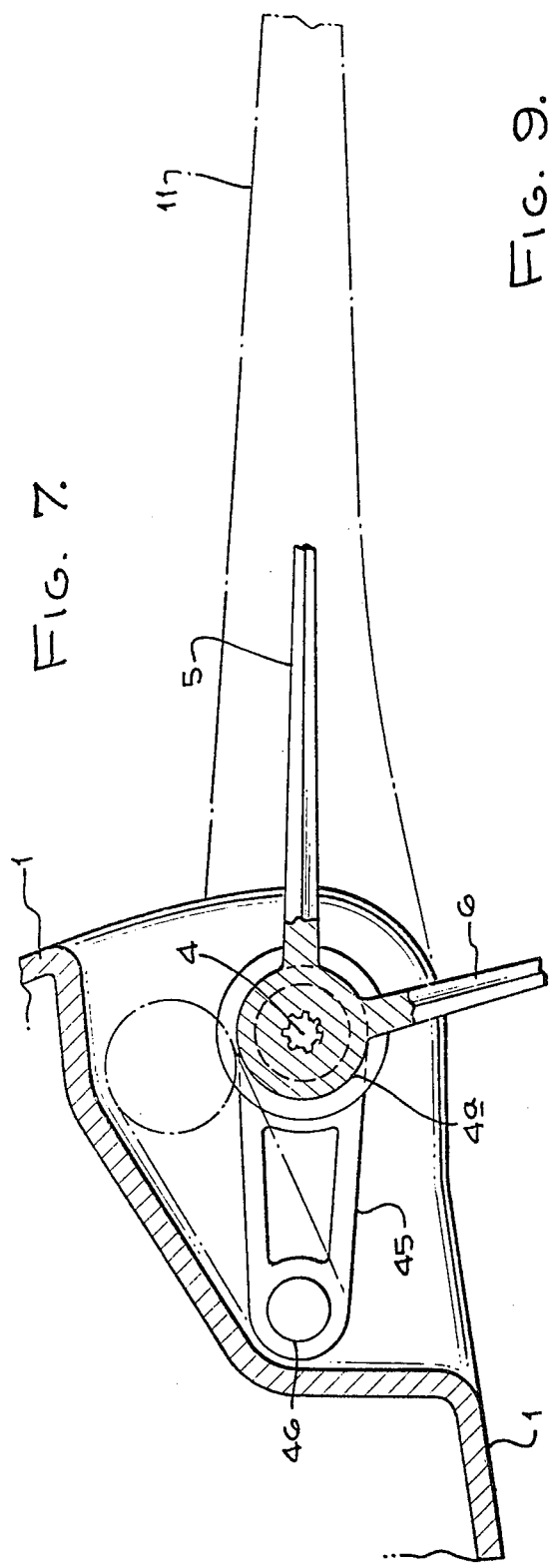
FIG. 7 is an enlarged section taken through the main hydrofoil pivot axis.
Figure 8B:
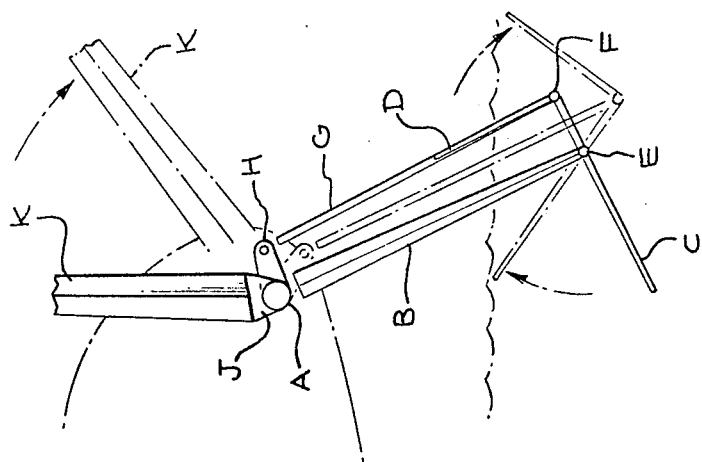
FIGS. 8a – 8c are views showing details of hydrofoil variations.
Figure 8A:
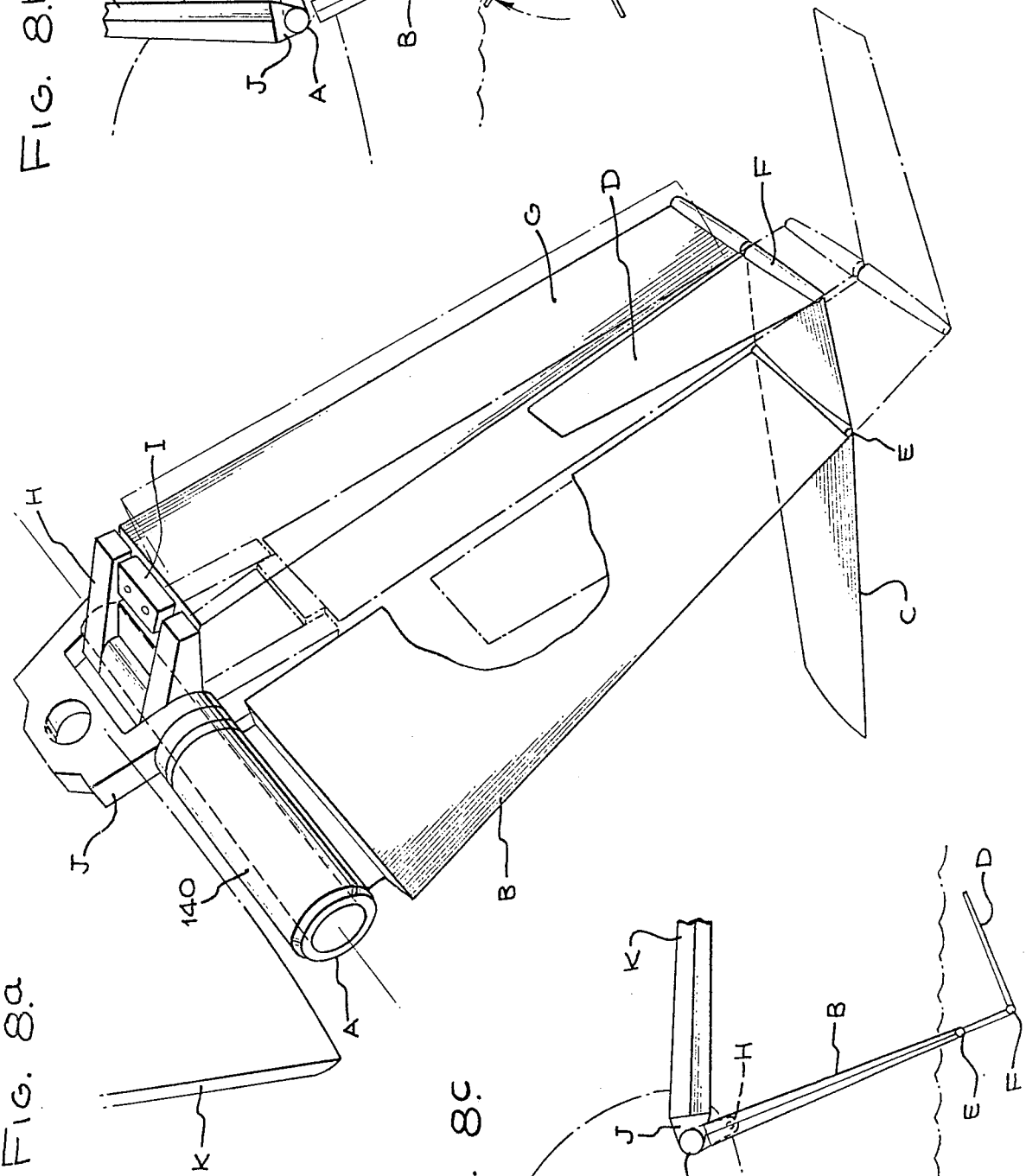
Figure 8C:
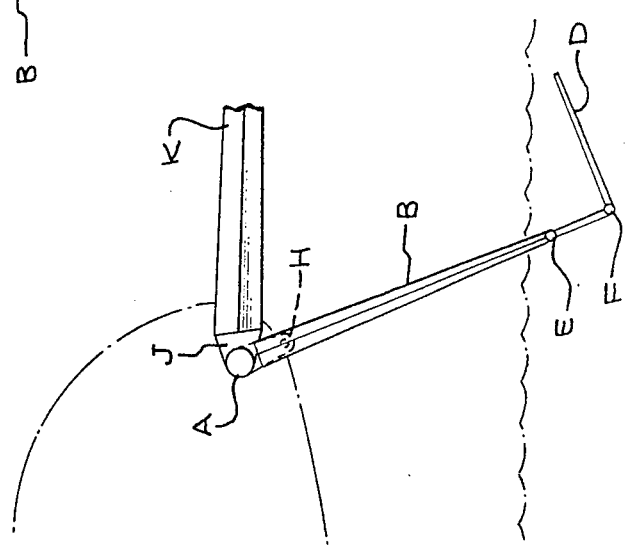

As seen in FIGS. 8a–8c, an alternative parallelogram hydrofoil configuration interfaces with the vehicle hull, wings and other components in a manner similar to the quadrant arrangement. Both the wing and articulated parts of the foil system rotate about a common pivot axis "A" defined by pivot 140. The primary structural element of the system is strut "B", which is fixed to the vehicle hull, or more likely the foil bumper system described in FIGS. 7 & 9. Attached to the base of strut "B", at hinge "E" is a hydrofoil surface "C" which incorporates both low and high speed hydrofoil cross-sections. Movement of foil "C" is controlled by the position of pin (or pivot) "F" which is located at the bottom end of foil/strut "G". The upper end of strut "G" is attached at pivot "I" to arm "H". This structure completes the parallelogram configuration which serves as the basis for foil movement during transition from high lift (take off) to high speed (foilborne or airborne operation).

The vehicle wing, "K" is attached to hinge "J" which may be linked to arm "H" mechanically utilizing a clutch, or other methods. This arrangement permits loads from wing movement to be transferred through the system to cause hydrofoil movement, or conversely, permits hydrofoil movement (reaction against the water stream at speed) to assist wing movement.

At take-off, the system is configured in the high lift position, (solid line, center and upper right) with foil surface "C" (the high lift portion) and struts "B" and "G" providing lifting as well as surface-piercing stabilizing forces. In this position, the high speed segment of the lower foil, "D" is aligned with strug "G", and produces very little drag. See FIG. 8b.

Once cruising speeds are attained, the system may be re-configured for higher speeds by rotation to a lower drag profile and to more efficient lifting surfaces, as seen in FIG. 8c. To initiate this movement, foil/strut "G" may be rotated about its spanwise axis to function as a flap, and causing movement at arm "H" and pin "F" by reaction in the water stream. With the wing or hydrofoil assembly free to move, the system then parallelogram closed forming a single, low drag strut with an extended high speed foil "D" at its end. In either position, strut "G" may function as a trailing edge flap providing increased lift during take offs and landings, and may also be used to produce hydrodynamic or aerodynamic roll, yaw and braking forces.

FIGS. 11a–11c correspond to FIGS. 4a–4c, and show three cross sections of a modified craft in three modes of operation, FIG. 11a in hullborne mode, FIG. 11b in foilborne mode, and FIG. 11c in airborne mode. Operational characteristics are essentially as before, except that the high-lift (high-drag) hydrofoils and the high-speed (low-drag) hydrofoils have been separated into different components. The wing structures 310 have been extended into and beneath the hull 311 so that when the wings are stowed in the vertical position as in FIG. 11a these extensions create a wider catamaran-like hull configuration to the rear of the vehicle to resist rolling caused by the wings in the wind.

The wings pivot about longitudinal hinges 312, and the pontoon portion of each wing extension 312a may contain fuel or other heavy items to help counterbalance the weight of the wing. In hullborne mode of FIG. 11a the main lifting hydrofoils 313 are positioned to extend longitudinally along the bases of the pontoon extensions. Each main foil 313 is rotated via a control linkage (indicated at 314) to pivot about an axis 315 and lock into place for foilborne operation. Note in FIG. 11b the foils 313 projecting downwardly and inwardly into the water. The high-speed hydrofoil 316 (including strut 316a and foil 316b) is lowered from its place in the hull to lock into position beneath the craft on the vehicle centerline, in FIG. 11b. During foilborne operation the vehicle may ride on both the high and low speed foils, the main foils 313 acting as efficient water surface piercing lifting surfaces providing roll recovery, automatically. In the event of impacts with logs or debris they may pivot safely about their axes 315 without damage to hull structure.

When sufficient speed for airborne operation has been attained, the wings 310 may be rotated down using wind or water pressure against lifting surfaces, or by using actuators 318. During wing rotation, the main foils 313 automatically pivot back to their stowed longitudinal position shown in FIG. 11c, and the high-speed foil provides support for the hull until the wings are locked into place with pins 320. During FIG. 11c airborne operation, the surfaces of pontoon extension 312a are flush with the fuselage/hull 311 for good aerodynamics. See FIG. 12. When the wings are stowed upright, the cavity 322 which houses each pontoon extension 312a acts as a stepped hull to reduce water drag and friction during take-offs and landings. While airborne, roll and vehicle turning is accomplished via ailerons in each wing tip.

I claim:

1. In a hydrofoil vehicle,
   (a) a forwardly extending hull having left and right sides, the hull being forwardly movable,
   (b) a hydrofoil system connected with the hull, said system including left and right hydrofoil units, each unit having pivotal connection to the hull to rotate about a generally forwardly extending axis, and between first and second positions,
   (c) each unit including strut means and hydrofoil sections connected therewith,
   (d) said hydrofoil sections in said first positions of the units being partially submerged to provide lift to urge the forwardly moving hull upwardly out of the water, and said hydrofoil sections in said second positions of the units being partially submerged to provide lift for maintaining the forwardly moving hull raised relative to water surface level,
   (e) and left and right wings carried by the hull to pivot about at least one axis, said wings being respectively coupled to the left and right units to rotate therewith as the units pivot between said first and second positions.

2. The vehicle of claim 1 wherein the strut means of each unit includes first and second struts which project generally radially away from said axis, and the hydrofoil sections includes first and second sections respectively connected with the first and second struts of each unit.

3. The vehicle of claim 2 wherein the first and second hydrofoil sections of each unit extend partially about said axis, and the first and second struts of each unit being spaced about said axis.

4. The vehicle of claim 3 wherein the first and second hydrofoil sections are integral.

5. The vehicle of claim 4 wherein each unit has generally quadrant configuration, said hydrofoil sections curving about said axis.

6. The vehicle of claim 2 wherein certain of said struts include pivoted flaps, and including means for controlling pivoting of said flaps.

7. The vehicle of claim 6 wherein certain flaps have positions wherein reaction forces generated by forward travel of the submerged flaps effect pivoting of the units into said first positions.

8. The vehicle of claim 2 wherein said first hydrofoil sections are characterized as having relatively low drag, and said second sections are characterized as having relatively high lift, said first and second sections submerged in said first positions of the units, and said first sections submerged when said second sections are elevated relative to the water level in said second positions of the units.

9. The vehicle of claim 1 wherein the units have third positions in which they are stowed within the boundary of the hull.

10. The vehicle of claim 1 including means to lock the hydrofoil sections in at least one of said positions.

11. In a hydrofoil vehicle
    (a) a forwardly extending hull having left and right sides, the hull being forwardly movable,
    (b) a hydrofoil system connected with the hull, said system including left and right hydrofoil units, each unit having pivotal connection to the hull to rotate about a generally forwardly extending axis, and between first and second positions,
    (c) each unit including strut means and hydrofoil sections connected therewith,
    (d) said hydrofoil sections in said first positions of the units being partially submerged to provide lift to urge the forwardly moving hull upwardly out of the water, and said hydrofoil sections in said second positions of the units being partially submerged to provide lift for maintaining the forwardly moving hull raised relative to water surface level,
    (e) and left and right wings carried by the hull to pivot about forwardly extending axis, said left and right wings being respectively coupled to the left and right units to rotate therewith as the units pivot between said first and second positions.

12. The vehicle of claim 11 wherein the wings have generally vertically upright stowed positions in which the wings are decoupled from said units.

13. In a hydrofoil vehicle,
    (a) a forwardly extending hull having left and right sides, the hull being forwardly movable.
    (b) a hydrofoil system connected with the hull, said system including left and right hydrofoil units, each unit having pivotal connection to the hull to rotate about a generally forwardly extending axis, and between first and second positions,
    (c) each unit including strut means and hydrofoil sections connected therewith,
    (d) said hydrofoil sections in said first positions of the units being partially submerged to provide lift to urge the forwardly moving hull upwardly out of the water, and said hydrofoil sections in said second positions of the units being partially submerged to provide lift for maintaining the forwardly moving hull raised relative to water surface level,
    (e) left and right wings carried by the hull to pivot about forwardly extending axes, a stabilizer elevator carried by the vehicle, and water level feeler struts carried to pivot at the outboard ends of the wings, the wings having flaps operatively connected to said feeler struts, and also carried at the nose of the vehicle and operatively connected to the stabilizer elevator.

14. In a hydrofoil vehicle,
    (a) a forwardly extending hull having left and right sides, the hull being forwardly movable,
    (b) a hydrofoil system connected with the hull, said system including left and right hydrofoil units, each unit having pivotal connection to the hull to rotate about a generally forwardly extending axis, and between first and second positions,
    (c) each unit including strut means and hydrofoil sections connected therewith,
    (d) said hydrofoil sections in said first positions of the units being partially submerged to provide lift to urge the forwardly moving hull upwardly out of the water, and said hydrofoil sections in said second positions of the units being partially submerged to provide lift for maintaining the forwardly moving hull raised relative to water surface level,
    (e) and forward hydrofoil means carried at the nose of the vehicle, there being a canard control foil carried to pivot at said nose above water level, said canard foil operatively connected with said forward hydrofoil means to be pivotally controlled thereby.

15. The vehicle of claim 14 including control means for controlling the forward hydrofoil means.

16. The vehicle of claim 14 including left and right wings carried by the hull to pivot about forwardly extending axis.

17. In a hydrofoil vehicle,
    (a) a forwardly extending hull having left and right sides, the hull being forwardly movable,
    (b) a hydrofoil system connected with the hull, said system including left and right hydrofoil units, each unit having pivotal connection to the hull to rotate about a generally forwardly extending axis, and between first and second positions,
    (c) each unit including strut means and hydrofoil sections connected therewith,
    (d) said hydrofoil sections in said first positions of the units being partially submerged to provide lift to urge the forwardly moving hull upwardly out of the water, and said hydrofoil sections in said second positions of the units being partially submerged to provide lift for maintaining the forwardly moving hull raised relative to water surface level,
    (e) and including forward hydrofoil means carried at the nose of the vehicle, there being a horizontal airfoil stabilizer carried at the tail of the vehicle, said stabilizer operatively connected with said forward hydrofoil means to be pivotally controlled thereby.

18. In an airborne vehicle,
    (a) a forwardly extending hull having left and right sides, the hull being forwardly movable,
    (b) left and right wings carried by the hull, and
    (c) water level feeler struts carried to pivot up and down at the outboard ends of the wings, the wings having swingable roll control flaps connected with said feeler struts whereby pivoting of the struts in response to contact with the surface of a body of water effects swinging of the flaps to control roll of the vehicle about its longitudinal axis and establish a level attitude of the vehicle.

19. The vehicle of claim 18 including a forward feeler strut carried to pivot up and down at the hull nose, the vehicle including a horizontal airfoil stabilizer operatively connected to said forward feeler strut to pivot up and down in response to said pivoting of the forward feeler strut.

20. In an airborne vehicle,
    (a) a forwardly extending hull having left and right sides, the hull being forwardly movable,
    (b) left and right wings carried by the hull,
    (c) feeler struts carried to pivot up and down at the outboard ends of the wings, the wings having swingable flaps operatively connected with said feeler struts whereby pivoting of the struts effects swing of the flaps,
    (d) a forward feeler strut carried to pivot up and down at the hull nose, the vehicle including a horizontal airfoil stabilizer operatively connected to said forward feeler strut to pivot up and down in response to said pivoting of the forward feeler strut, the forward feeler strut trailing below the level of the hull nose, and including hydrofoil means carried by trailing extent of said forward strut, said stabilizer located at the tail of the vehicle.

21. In a hydrofoil vehicle,
    (a) a forwardly extending hull having left and right sides, the hull being forwardly movable,
    (b) a hydrofoil system connected with the hull, said system including left and right hydrofoil units, each unit having pivotal connection to the hull to rotate about a generally forwardly extending axis, and between first and second positions,
    (c) each unit including strut means and hydrofoil sections connected therewith,
    (d) said hydrofoil sections in said first positions of the units being partially submerged to provide lift to urge the forwardly moving hull upwardly out of the water, and said hydrofoil sections in said second positions of the units being partially submerged to provide lift for maintaining the forwardly moving hull raised relative to water surface level,
    (e) left and right wings carried by the hull to pivot about at least one axis relative to the hull,
    (f) feeler struts carried to pivot up and down at the outboard ends of the wings, the wings having swingable roll control flaps operatively connected with the struts so that providing of the struts effects swinging of the flaps to control roll of the vehicle.

22. In a hydrofoil vehicle,
    (a) a forwardly extending hull having left and right sides, the hull being forwardly movable,
    (b) left and right units, each unit having pivotal connection to the hull to rotate about a generally forwardly extending axis, and between first and second positions,
    (c) each unit including at least one planing section,
    (d) said sections in said first positions of the units being positioned to provide lift to urge the forwardly moving hull upwardly out of the water, and said sections in said second positions of the units being positioned to provide lift for maintaining the forwardly moving hull raised relative to water surface level,
    (e) and left and right wings carried by the hull to pivot about at least one axis, said wings being respectively coupled to the left and right units to rotate therewith as the units pivot between said first and second positions.

23. In a hydrofoil vehicle,
    (a) a forwardly extending hull having left and right sides, the hull being forwardly movable,
    (b) left and right wings carried by the hull to pivot between raised and lowered positions,
    (c) left and right hydrofoil units carried by the hull to pivot between extended and retracted positions, the units in extended positions having hydrofoils which are variably pivotable while submerged in water to vary lift transmission to the hull, and
    (d) said wings coupled to said units to pivot therewith.

24. The vehicle of claim 23 wherein said units include wing extensions to which the hydrofoils are connected to pivot relatively forwardly and rearwardly.

25. The vehicle of claim 24 wherein said hydrofoils are stowed adjacent the hull in said unit retracted position.

26. The vehicle of claim 24 including an auxiliary hydrofoil located between said left and right units, said auxiliary unit including a vertically movable strut and a foil carried thereby for movement upwardly and downwardly in submerged condition.

* * * * *